(12) United States Patent
Shinmura

(10) Patent No.: US 7,723,882 B2
(45) Date of Patent: May 25, 2010

(54) ELECTRIC MOTOR

(75) Inventor: Naohisa Shinmura, Iwata (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 0 days.

(21) Appl. No.: 12/232,827

(22) Filed: Sep. 25, 2008

(65) Prior Publication Data

US 2009/0115272 A1   May 7, 2009

(30) Foreign Application Priority Data

Nov. 6, 2007   (JP) .............................. 2007-288502

(51) Int. Cl.
*H02K 7/10* (2006.01)
(52) U.S. Cl. ......................................... 310/90; 310/83
(58) Field of Classification Search ................... 310/90, 310/83

See application file for complete search history.

(56) References Cited

U.S. PATENT DOCUMENTS

| | | | |
|---|---|---|---|
| 6,044,723 A * | 4/2000 | Eda et al. .................. | 74/388 PS |
| 6,853,104 B2 * | 2/2005 | Shiraki et al. .................. | 310/90 |
| 7,034,421 B1 * | 4/2006 | Walther ........................ | 310/90 |
| 2005/0140224 A1 * | 6/2005 | Weigold et al. ................ | 310/90 |
| 2006/0181161 A1 * | 8/2006 | Kawamoto et al. ............. | 310/51 |
| 2006/0240932 A1 * | 10/2006 | Hazama et al. .............. | 475/169 |

FOREIGN PATENT DOCUMENTS

JP   10-285871   10/1998

* cited by examiner

*Primary Examiner*—Quyen Leung
*Assistant Examiner*—Terrance Kenerly
(74) *Attorney, Agent, or Firm*—Posz Law Group, PLC

(57) ABSTRACT

A closer is configured into a generally cylindrical shape and is provided to a rotatable shaft of an electric motor to rotate integrally with the rotatable shaft relative to a housing. The closer is at least partially received in an opening of a bearing receiver of the housing, which receives a bearing. The closer has an opposed end surface, which is axially opposed to an outer end surface of the bearing and defines a lubricant holding space in cooperation with the outer end surface of the bearing, an inner peripheral surface of the bearing receiver and an outer peripheral surface of the rotatable shaft. A lubricant is applied to the outer end surface of the bearing.

9 Claims, 2 Drawing Sheets

ELECTRIC MOTOR

CROSS REFERENCE TO RELATED APPLICATION

This application is based on and incorporates herein by reference Japanese Patent Application No. 2007-288502 filed on Nov. 6, 2007.

BACKGROUND OF THE INVENTION

1. Field of the Invention

The present invention relates to an electric motor.

2. Description of Related Art

For example, Japanese Unexamined Patent Publication No. H10-285871 discloses a motor actuator, which drives an air flow passage switching door of an air conditioning system of a vehicle. In an electric motor, which is used as a drive source of the motor actuator, a bearing is fixed in an interior of a tubular bearing receiver formed in a housing of the motor and rotatably supports a rotatable shaft. A distal end section of the rotatable shaft projects outward from an opening of the bearing receiver to an outside of the housing. A speed reducing gear, which reduces a rotational speed of the rotatable shaft in corporation with an external gear, is fixed to the distal end section of the rotatable shaft.

In the above motor, due to a viscosity of a lubricant (e.g., a grease), the lubricant is adhered to an outer end surface of the bearing, which is exposed from the opening of the bearing receiver. Thereby, the lubricant is thoroughly applied between the bearing and the rotatable shaft to improve the lubricity of the bearing, so that the noise of the motor and of the entire motor actuator can be reduced. However, in the above motor, due to a reduction in the viscosity of the lubricant under the high temperature state or due to a centrifugal force of the rotatable shaft, the lubricant, which is applied to the bearing, may possibly flow out to the outside of the housing, thereby resulting in generation of a noise caused by the rotational friction.

SUMMARY OF THE INVENTION

The present invention addresses the above disadvantage. According to the present invention, there may be provided an electric motor, which includes a housing, a bearing, a rotatable shaft and a lubricant. The housing has a bearing receiver, which is configured into a generally cylindrical shape. The bearing is fixed in an interior of the bearing receiver. The rotatable shaft is rotatably supported by the bearing and has a distal end section, which projects outward to an outside of the housing through an opening of the bearing receiver. The lubricant is applied to an outer end surface of the bearing. The rotatable shaft has a closing means for substantially closing the opening of the bearing receiver. The closing means is at least partially received in the opening of the bearing receiver and is opposed to the outer end surface of the bearing.

Alternatively, there may be provided an electric motor, which includes a housing, a bearing, a rotatable shaft, a closer and a lubricant. The housing has a bearing receiver, which is configured into a generally cylindrical shape. The bearing is fixed in an interior of the bearing receiver. The rotatable shaft is rotatably supported by the bearing and has a distal end section, which projects outward to an outside of the housing through an opening of the bearing receiver. The closer is configured into a generally cylindrical shape and is provided to the rotatable shaft to rotate integrally with the rotatable shaft relative to the housing. The closer is at least partially received in the opening of the bearing receiver to substantially close the opening of the bearing receiver and has an outer diameter larger than an outer diameter of an adjacent part of the rotatable shaft, which is adjacent to the closer, and the closer has an opposed end surface, which is axially opposed to an outer end surface of the bearing and defines a lubricant holding space in cooperation with the outer end surface of the bearing, an inner peripheral surface of the bearing receiver and an outer peripheral surface of the rotatable shaft. The lubricant is applied to the outer end surface of the bearing around the rotatable shaft in the lubricant holding space.

DETAILED DESCRIPTION OF THE INVENTION

An embodiment of the present invention will be described with reference to the accompanying drawings.

Figure 1:
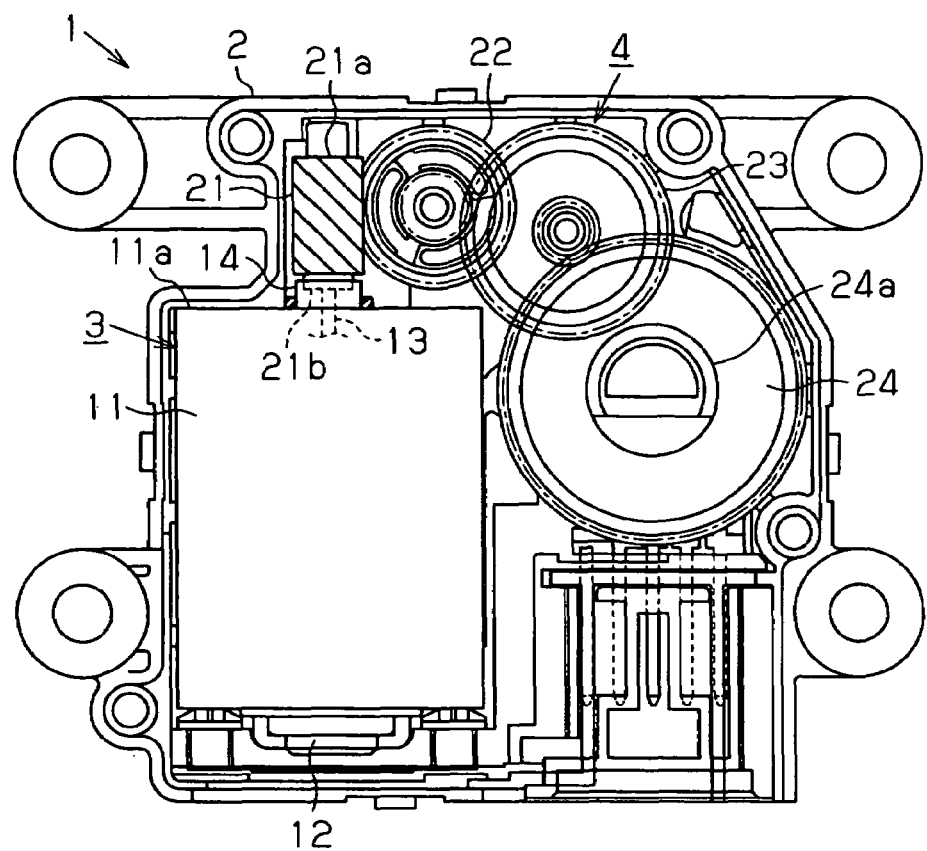
FIG. 1 is a plan view of a motor actuator upon removal of a case cover according to an embodiment of the present invention.

FIG. 1 shows a motor actuator 1, which uses an electric motor 3 as a drive source. The motor actuator 1 is used to drive an air flow passage switching door of an air conditioning system of a vehicle. As shown in FIG. 1, the motor actuator 1 includes the electric motor 3 and a speed reducing mechanism 4, which are received in a cup-shaped case 2. In FIG. 1, for the descriptive purpose, a case cover, which closes an opening of the case 2, is removed to show an internal structure inside the case 2.

A housing of the motor 3, which is supported by the case 2, includes a yoke housing (hereinafter, simply referred to as a yoke) 11, which has a generally cup-shaped body, and an end housing 12, which is fixed to close an opening end (a lower end in FIG. 1) of the yoke 11. A base end of a rotatable shaft 13 is rotatably supported by a bearing (not shown), which is fixed to a center of the end housing 12 in the interior of the end housing 12.

Figure 2:
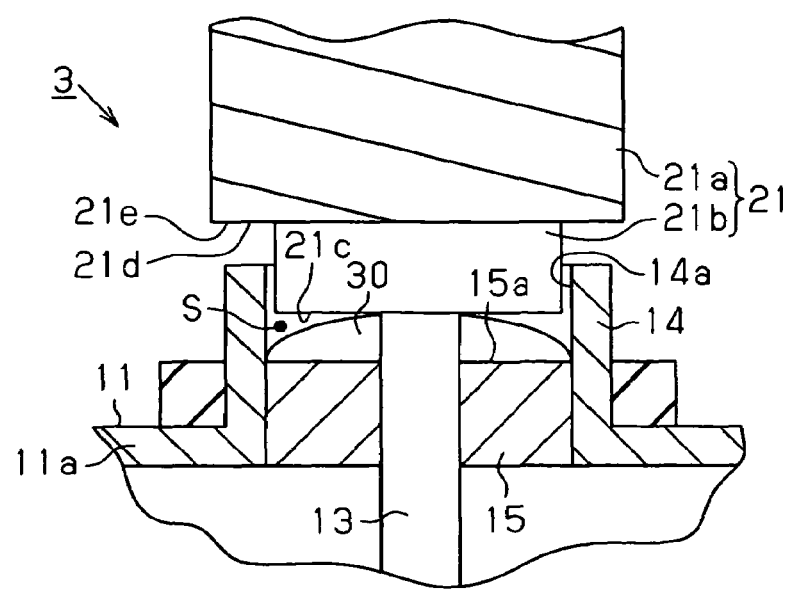
FIG. 2 is a partial cross sectional view showing a portion of a motor of the motor actuator shown in FIG. 1.

As shown in FIG. 2, a generally cylindrical (tubular) bearing receiver 14, which projects toward an outside of the yoke 11, is formed in a center of a base portion 11a of the yoke 11. A bearing 15 is fixed to a base end inner surface of the bearing receiver 14 to rotatably support a portion of the rotatable shaft 13, which is located on a distal end side of a longitudinal center of the rotatable shaft 13. The bearing 15 is an annular metal bearing (plain bearing), which has a rectangular cross section when it is viewed in a direction perpendicular to a plane of the sheet of FIG. 2. An outer peripheral surface of the bearing 15 is closely fixed to an inner peripheral surface of the bearing receiver 14. The bearing 15 rotatably supports the rotatable shaft 13 at an inner peripheral surface of the bearing 15. An armature (not shown), around which coils are wound, is received in an interior of the yoke 11, and magnets (not shown) are fixed to an inner peripheral surface of the yoke 11 to radially oppose the armature. When an electric current is supplied to the coils, a rotational magnetic field is generated at the armature to rotate the rotatable shaft 13.

As shown in FIG. 1, a worm arrangement 21, which has a cup shape, is fixed to a distal end section of the rotatable shaft 13, which projects outward to the outside of the yoke 11. The worm arrangement 21 includes a worm 21a, which serves as a speed reducing gear and has teeth at an outer peripheral portion of the worm 21a. A distal end side of the worm 21a is supported by a lateral wall of the case 2 to receive the thrust load. An outer diameter of the worm arrangement 21 (specifically, an outer diameter of the worm 21a) is made larger than an outer diameter of the bearing receiver 14. The speed reducing mechanism 4 includes the worm arrangement 21, a worm wheel 22, an intermediate gear 23 and an output gear 24. The worm wheel 22 is rotatably supported by the case 2. The rotation of the motor 3 (thereby, the rotation of the rotatable shaft 13) is conducted to the speed reducing mechanism 4 to reduce the rotational speed thereof and is thereafter transmitted to an output shaft 24a, which is provided to the center of the output gear 24, to drive the air flow passage switching door.

Next, the structure of the motor 3 around the bearing 15 will be described with reference to FIG. 2. A grease 30, which serves as a lubricant, is applied to an entire area of an outer end surface (worm arrangement 21 side end surface) 15a of the bearing 15. Due to the viscosity of the grease 30, the grease 30 is held in the interior of the bearing receiver 14, and the surface of the grease 30 is bulged toward the rotatable shaft 13. When the grease 30 adheres in the above described manner, the grease is supplied between the inner peripheral surface of the bearing 15 and the rotatable shaft 13.

A closer 21b, which serves as a closing member, is formed integrally with the worm 21a in the worm arrangement 21. The closer 21b is formed as a generally cylindrical body, which extends from a base end surface 21e of the worm 21a toward the motor 3 and is received in the bearing receiver 14. An inner peripheral surface of the closer 21b closely contacts the rotatable shaft 13, and an outer diameter of the closer 21b is set to have its possible maximum diameter, which will not cause an interference with an inner peripheral surface of the bearing receiver 14. Also, the outer diameter of closer 21b is set to be larger than an outer diameter of the adjacent part of the rotatable shaft 13, which is adjacent to the closer 21b. An axial length of the closer 21b is set to avoid an interference with the outer end surface 15a of the bearing 15. A lubricant holding space S is formed between the outer end surface 15a of the bearing 15 and an opposed end surface 21c of the closer 21b, which is axially opposed to the outer end surface 15a. More specifically, the lubricant holding space S is formed by the opposed end surface 21c of the closer 21b, the outer end surface 15a of the bearing 15, the inner peripheral surface of the bearing receiver 14 and the outer peripheral surface of the rotatable shaft 13. An axial half of the closer 21b is substantially received into an opening 14a of the bearing receiver 14.

In the above described motor 3, the lubricant holding space S of the bearing receiver 14 is communicated with the outside of the yoke 11 only through a small gap (open gap) between the inner peripheral surface of the bearing receiver 14 and the outer peripheral surface of the closer 21b. Therefore, even in a case where the viscosity of the grease 30 drops due to a temperature increase in the motor 3, it is possible to limit the outflow of the grease 30. Furthermore, even if the grease 30 leaks out through the open gap, the leaked grease 30 is retained between a distal end section of the bearing receiver 14 and a stepped portion 21d, which is made of the base end surface 21e of the worm 21a and the closer 21b.

Next, advantages of the present embodiment will be described.

(1) The closer 21b, which serves as a closing means, is received in the opening 14a of the bearing receiver 14 to oppose the outer end surface 15a of the bearing 15 and to substantially close the opening 14a of the bearing receiver 14 except the gap between the inner peripheral surface of the bearing receiver 14 and the closer 21b. Therefore, the gap between the inner peripheral surface of the bearing receiver 14 and the closer 21b is formed as the only gap, which extends from the lubricant holding space S of the bearing receiver 14 to the outside of the yoke 11, so that the outflow of the grease 30 can be limited. Also, the closer 21b is received into the opening 14a of the bearing receiver 14. Therefore, even when an installation error in an axial direction of the closer 21b occurs, a size of the open gap does not change, and thereby the structure for limiting the outflow of the grease 30 with use of the closer 21b can be maintained.

(2) The closer 21b is formed integrally with the worm 21a of the worm arrangement 21, which serves as the speed reducing gear fixed to the distal end section of the rotatable shaft 13. Therefore, the closing means can be implemented without increasing the number of the components.

(3) The stepped portion 21d is formed by the base end surface 21e of the worm 21a and the closer 21b in the worm arrangement 21, so that the leaked grease, which is leaked through the open gap, can be retained between the stepped portion 21d and the distal end section of the bearing receiver 14.

The above embodiment of the present invention may be modified as follows.

Figure 3A:
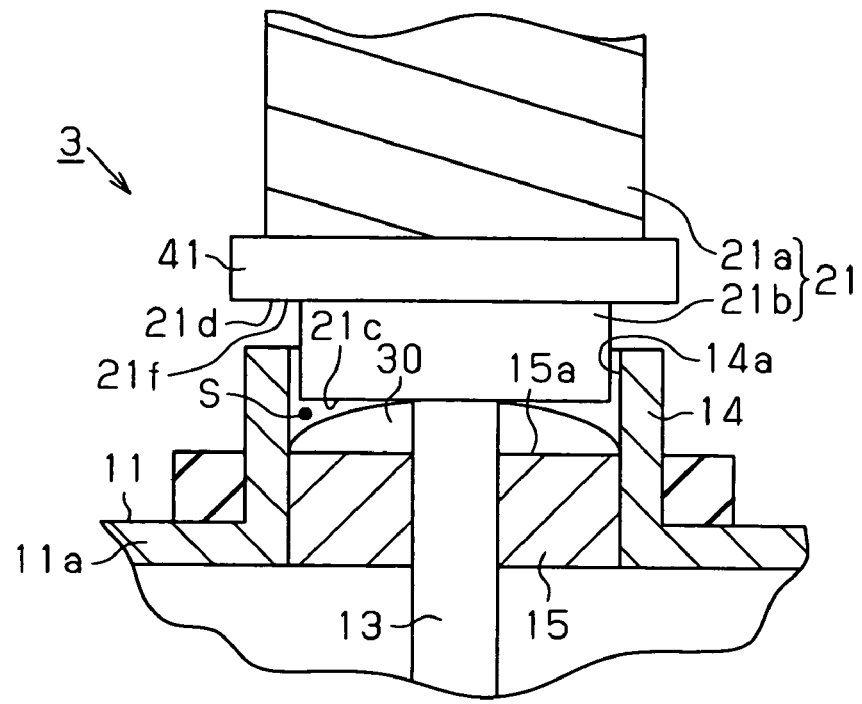
FIGS. 3A and 3B are partial cross sectional views showing modifications, respectively, of the embodiment of the present invention.

In the above embodiment, a flange 41, for example, shown in FIG. 3A may be provided at a boundary between the worm 21a and the closer 21b, and the stepped portion 21d may be formed by the flange 41 and the closer 21b. Specifically, the flange 41 is provided at an end of the worm 21a, which is located on a bearing receiver side of the worm 21a, to radially outwardly projects from the worm 21a. The closer 21b axially projects from a base end surface 21f of the flange 41, which is located on a bearing receiver side of the flange 41, into the opening 14a of the bearing receiver 14. The base end surface 21f of the flange 41 and the closer 21b form the stepped portion 21d. A gap is formed between the stepped portion 21d and the bearing receiver 14 to hold a leaked portion of the grease 30, which is leaked from the interior of the bearing receiver 14.

In the above embodiment, the closer 21b, which serves as the closing means, is formed integrally with the worm 21a in the worm arrangement 21. Alternatively, the closing means (the closer 21b) may be formed separately from the worm 21a.

In the above embodiment, the worm 21a is used as the speed reducing gear. Alternative to the worm, a spur gear may be used as the speed reducing gear.

Figure 3B:
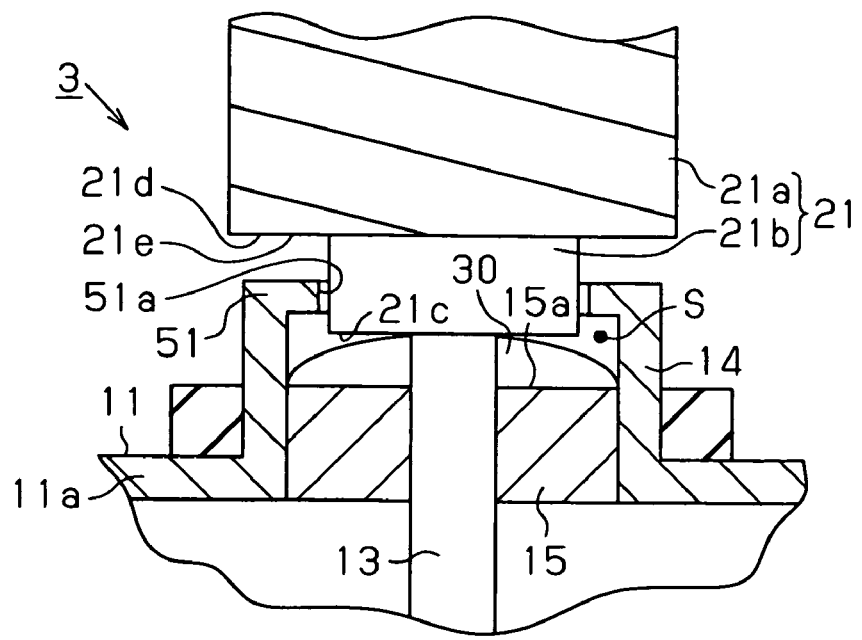

In the above embodiment, the bearing receiver 14 is formed as the generally cylindrical portion, which extends straight in the axial direction. Alternatively, as shown in FIG. 3B, a distal end part 51 of the bearing receiver 14 may be bent to radially inwardly protrude toward the inner side of the bearing receiver 14 along the entire perimeter of the distal end part 51 to form an annular end protrusion. With this structure, the grease 30 will not enter easily into a gap between an opening 51a of the distal end part 51 of the bearing receiver 14 and the closer 21b. Therefore, it is possible to limit the outflow of the grease 30.

In the above embodiment, the bearing receiver 14 is formed to project outward toward the outside of the yoke 11. Alternatively, the bearing receiver 14 may be formed to project inward toward the interior of the housing 11.

In the above embodiment, the metal bearing is used as the bearing 15. Alternatively, any other appropriate bearing (e.g., an oil impregnated bearing or a ball bearing) may be used as the bearing 15 in place of the metal bearing.

In the above embodiment, the grease 30 is used as the lubricant. However, the lubricant is not limited to the grease, and any other type of lubricant may be used in place of the grease 30.

In the above embodiment, the motor actuator 1 is used in the air conditioning system of the vehicle. Alternatively, the motor actuator 1 may be used in any other appropriate system or apparatus other than the air conditioning system of the vehicle. For example, the motor actuator 1 may be used in a headlamp control system (e.g., an adaptive front lighting system) of the vehicle.

Additional advantages and modifications will readily occur to those skilled in the art. The invention in its broader terms is therefore not limited to the specific details, representative apparatus, and illustrative examples shown and described.

What is claimed is:

1. An electric motor comprising:
   a housing that has a bearing receiver, which is configured into a generally cylindrical shape;
   a bearing that is fixed in an interior of the bearing receiver;
   a rotatable shaft that is rotatably supported by the bearing and has a distal end section, which projects outward to an outside of the housing through an opening of the bearing receiver; and
   a lubricant that is applied to an outer end surface of the bearing, wherein:
   the rotatable shaft has a closing means for substantially closing the opening of the bearing receiver;
   the closing means is at least partially received in the opening of the bearing receiver and is opposed to the outer end surface of the bearing;
   the closing means is formed integrally with a speed reducing gear that is fixed to the distal end section of the rotatable shaft on a side of the closing means, which is opposite from the bearing receiver;
   a distal end part of the bearing receiver, which projects toward the outside of the housing, radially inwardly protrudes;
   the closing means includes a closer that axially projects from a base end surface of the speed reducing gear, which is located on a bearing receiver side of the speed reducing gear, into the opening of the bearing receiver;
   the base end surface of the speed reducing gear and the closer form a stepped portion;
   a gap is formed between the stepped portion and the bearing receiver to hold a leaked portion of the lubricant, which is leaked from the interior of the bearing receiver; and
   an outer diameter of the speed reducing gear is larger than an outer diameter of the bearing receiver.

2. An electric motor comprising:
   a housing that has a bearing receiver, which is configured into a generally cylindrical shape;
   a bearing that is fixed in an interior of the bearing receiver;
   a rotatable shaft that is rotatably supported by the bearing and has a distal end section, which projects outward to an outside of the housing through an opening of the bearing receiver; and
   a lubricant that is applied to an outer end surface of the bearing, wherein:
   the rotatable shaft has a closing means for substantially closing the opening of the bearing receiver;
   the closing means is at least partially received in the opening of the bearing receiver and is opposed to the outer end surface of the bearing;
   the closing means is formed integrally with a speed reducing gear that is fixed to the distal end section of the rotatable shaft on a side of the closing means, which is opposite from the bearing receiver;
   a distal end part of the bearing receiver, which projects toward the outside of the housing, radially inwardly protrudes;
   a flange is provided at an end of the speed reducing gear, which is located on a bearing receiver side of the speed reducing gear, to radially outwardly projects from the speed reducing gear;
   the closing means includes a closer that axially projects from a base end surface of the flange, which is located on a bearing receiver side of the flange, into the opening of the bearing receiver;
   the base end surface of the flange and the closer form a stepped portion;
   a gap is formed between the stepped portion and the bearing receiver to hold a leaked portion of the lubricant, which is leaked from the interior of the bearing receiver; and
   an outer diameter of the speed reducing gear is larger than an outer diameter of the bearing receiver.

3. The electric motor according to claim 1, wherein the speed reducing gear is a worm.

4. The electric motor according to claim 1, wherein the bearing is a plain bearing.

5. An electric motor comprising:
   a housing that has a bearing receiver, which is configured into a generally cylindrical shape;
   a bearing that is fixed in an interior of the bearing receiver;
   a rotatable shaft that is rotatably supported by the bearing and has a distal end section, which projects outward to an outside of the housing through an opening of the bearing receiver;
   a closer that is configured into a generally cylindrical shape and is provided to the rotatable shaft to rotate integrally with the rotatable shaft relative to the housing, wherein the closer is at least partially received in the opening of the bearing receiver to substantially close the opening of the bearing receiver and has an outer diameter larger than an outer diameter of an adjacent part of the rotatable shaft, which is adjacent to the closer, and the closer has an opposed end surface, which is axially opposed to an outer end surface of the bearing and defines a lubricant holding space in cooperation with the outer end surface of the bearing, an inner peripheral surface of the bearing receiver and an outer peripheral surface of the rotatable shaft; and
   a lubricant that is applied to the outer end surface of the bearing around the rotatable shaft in the lubricant holding space, wherein
   a speed reducing gear is provided to the distal end section of the rotatable shaft on a side of the closer, which is opposite from the bearing receiver;
   a base end surface of the speed reducing gear, which is located on a bearing receiver side of the speed reducing gear, and the closer form a stepped portion; and
   a gap is formed between the stepped portion and the bearing receiver to hold a leaked portion of the lubricant, which is leaked from the interior of the bearing receiver;
   a distal end part of the bearing receiver, which projects toward the outside of the housing, radially inwardly protrudes; and
   an outer diameter of the speed reducing gear is larger than an outer diameter of the bearing receiver.

6. The electric motor according to claim 5, wherein the speed reducing gear is a worm.

7. The electric motor according to claim 5, wherein a flange, which projects radially outward from the speed reducing gear, is axially interposed between the speed reducing gear and the closer.

8. The electric motor according to claim 7, wherein: a base end surface of the flange, which is located on a bearing receiver side of the flange, and the closer form a stepped portion; and a gap is formed between the stepped portion and the bearing receiver to hold a leaked portion of the lubricant, which is leaked from the interior of the bearing receiver.

9. The electric motor according to claim 5, wherein the bearing is a plain bearing.

* * * * *